UNITED STATES PATENT OFFICE 2,367,053

DISAZO DYESTUFFS

William B. Reynolds, Chicago, Ill., Swanie S. Rossander, Wilmington, Del., and Donovan E. Kvalnes, Penns Grove, N. J., assignors to E. I. du Pont de Nemours & Company, Wilmington, Del., a corporation of Delaware No Drawing. Application September 6, 1941, Serial No. 409,832

7 Claims. (Cl. 260—161)

This invention relates to azo dyestuffs prepared from 2,2'-dichlortolidine-5,5'-disulfonic acid by coupling that diazotized intermediate to azo dyestuffs coupling components. The dichlortolidine-disulfonic acid used as a tetrazo component is prepared according to the process described in the copending application of William B. Reynolds, Serial No. 432,246, filed February 25, 1942, now U. S. Patent 2,346,941.

The dichlortolidine disulfonic acid, when diazotized and coupled to azo dyestuff coupling components, yields colors of excellent properties. Any azo dyestuff coupling component is useful although variations in properties are observed in the products. The azo component may be coupled to 2 moles of the same coupling component or to one mole of one coupling component and another mole of a different coupling component. The dyes produced from this intermediate are represented by the formula

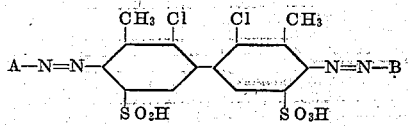

in which A and B represent azo dyestuff coupling components which may be the same or may be different. Coupling components of the phenylalkylpyrazolone series are particularly adapted to the production of useful dyes with this intermediate.

The following examples, in which parts are in general by weight, illustrate the invention:

Example 1

Four hundred and forty-one parts of 2,2'-dichlortolidine-5,5'-disulfonic acid are dissolved in 1000 parts of water and 80 parts of sodium hydroxide. The solution is iced to 0° C. and 138 parts of sodium nitrite are added. Then 256 parts of 100% hydrochloric acid (as a 10 N solution) are added all at once. Stirring at 0-5° C. is continued until tetrazotization is complete. The tetrazo is essentially out of solution.

A solution of 348 parts of phenyl methyl pyrazolone in 3,000 parts of water and 80 parts of sodium hydroxide is cooled to 0° C. by the addition of ice and 600 parts of sodium carbonate are added. To this solution is added the tetrazo suspension. Stirring is continued until coupling is complete. The dye is filtered off and dried. It dyes wool from an acetic acid bath a greenish yellow shade of excellent fastness to light, fulling, washing and perspiration. It also dyes wool very well under neutral conditions yielding the same shade and having the same fastness properties. Furthermore, it dyes nylon a yellow shade having good fastness to light and wet treatments.

Example 2

If 161 parts of 2,4 dihydroxy quinoline are used instead of the phenyl methyl pyrazolone in Example 1, a product is obtained which dyes wool and nylon in greenish yellow shades of good fastness to light, washing and fulling.

Example 3

Four hundred and forty-one parts of 2,2'-dichlortolidine-5,5'-disulfonic acid are suspended in 1,000 parts of water and cooled to 5° C. by the addition of ice. Sixty-nine parts of sodium nitrite are added. After stirring 25 minutes, a solution of the mono diazotized material is obtained. Sufficient hydrochloric acid is added to render the solution definitely acid to Congo red paper and stirring is continued for ten minutes. Two hundred and fifty-four parts of 4' sulfo phenyl methyl pyrazolone are dissolved in 1500 parts of water, 40 parts of sodium hydroxide and 300 parts of sodium bicarbonate. After this solution is cooled to 0° C. the above diazo solution is added. After coupling is complete the monazo dye is isolated by salting and filtration and is redissolved in 2500 parts of water and 40 parts of sodium hydroxide. Sixty-nine parts of sodium nitrite are added and sufficient ice to cool it to 0° C. Then hydrochloric acid is added until the suspension is strongly acid to Congo red. Stirring is continued until diazotization is complete.

Ninety-five parts of phenol are dissolved in 500 parts of water and 40 parts of sodium hydroxide. Three hundred parts of sodium carbonate are added and the solution is iced to 0° C. The above diazo suspension is added to the phenol solution and stirring is continued until coupling is complete.

The coupling mixture is heated until the dye is completely in solution. The temperature is adjusted to 60-70° C. and 200 parts of para tolyl sulfone chloride are added during thirty minutes. Sodium carbonate is added from time to time to maintain Brilliant Yellow alkalinity. If the condensation is not complete after the final addition of the sulfone chloride, more is added so that the phenolic hydroxyl group is completely converted to the sulfone ester.

The dye is isolated by salting and filtering and has the following formula:

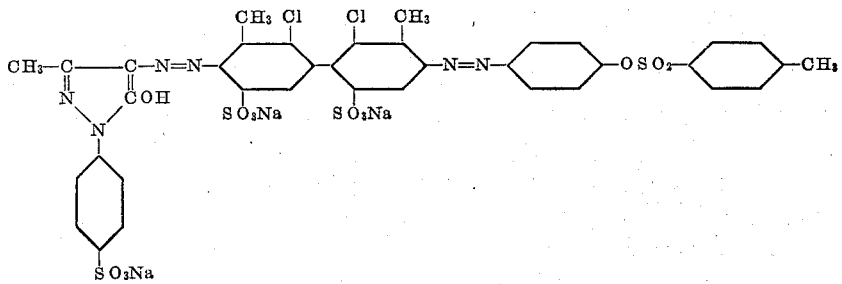

It dyes wool a greenish-yellow shade of excellent fastness to light and fulling.

The same dye can be prepared by coupling the tetrazo described in Example 1, first with one mole of 4'-sulfo-phenyl-methyl-pyrazolone and then with one mole of phenol, followed by condensation with para-tolyl-sulfone-chloride. In place of the latter, other aryl sulfone chlorides can be used. Examples of these are benzene sulfone chloride, para chlor benzene sulfone chloride, beta naphthyl sulfone chloride, etc.

| Example | One mole of— | Coupled to two moles of— | Shade |
|---|---|---|---|
| 4 | Dichlortolidine disulfonic acid | Aceto acetanilide | Yellow. |
| 5 | do | Acetoacet-o-chloro anilide | Do. |
| 6 | do | Acetoacet-p-chloro anilide | Do. |
| 7 | do | Acetoacet-o-toluidide | Do. |
| 8 | do | Acetoacet-m-xylidide | Do. |
| 9 | do | Acetoacet-p-phenetidide | Do. |
| 10 | do | 3' nitro phenyl methyl pyrazolone | Do. |
| 11 | do | 4' nitro phenyl methyl pyrazolone | Do. |
| 12 | do | 4' sulfo phenyl methyl pyrazolone | Do. |
| 13 | do | 3' sulfo phenyl methyl pyrazolone | Do. |
| 14 | do | 4' chlor 3' sulfo phenyl methyl pyrazolone | Do. |
| 15 | do | 3', 4' dichloro phenyl methyl pyrazolone | Do. |
| 16 | do | 2' chloro 5' sulfo phenyl methyl pyrazolone | Do. |
| 17 | do | 3' amino phenyl methyl pyrazolone | Do. |
| 18 | do | 4' amino phenyl methyl pyrazolone | Do. |
| 19 | do | 2', 5' dichlor-4'-sulfo phenyl methyl pyrazolone | Do. |
| 20 | do | 1-phenyl pyrazolone-3-carboxylic acid | Do. |
| 21 | do | 1-phenyl pyrazolone-3-carboxylic ethyl ester | Do. |
| 22 | do | 1-(4' nitro phenyl)pyrazolone-3-carboxylic acid | Do. |
| 23 | do | 1-(4' nitro phenyl)pyrazolone -3- carboxylic ethyl ester | Do. |
| 24 | do | 4'8' disulfo 2' naphthyl methyl pyrazolone | Do. |
| 25 | do | 4'8' disulfo 2' naphthyl pyrazolone 3-carboxylic acid | Do. |
| 26 | do | Naphthionic acid | Orange. |
| 27 | do | 2-acetyl amino-7-naphthol | Yellow brown. |
| 28 | do | 1-acetyl amino-7-naphthol | Orange. |
| 29 | do | 2-hydroxy-3-naphthoic acid | Do. |
| 30 | do | Anilide of 2-hydroxy-3-naphthoic acid | Salmon. |
| 31 | do | 2-amino-3-naphthoic acid | Orange. |
| 32 | do | 2-acetyl amino-5-naphthol-7-sulfonic acid | Yellow orange |
| 33 | do | 2-carbethoxy amino-5-naphthol-7-sulfonic acid | Do. |
| 34 | do | 2 (beta-amino-ethyl)-5-naphthol-7-sulfonic acid | Red orange. |
| 35 | do | 2-benzoyl amino-5-naphthol-7-sulfonic acid | Orange. |
| 36 | do | 2(4' nitro benzoyl amino)-5-naphthol-7 sulfonic acid | Do. |
| 37 | do | 2(para-tolyl sulfonyl amino) 5 naphthol 7 sulfonic acid | Do. |
| 38 | do | 2(phenyl amino)-8-naphthol-6-sulfonic acid | Brown. |
| 39 | do | 2-amino-8-naphthol-6-sulfonic acid | Yellow red. |
| 40 | do | 1-acetyl amino-8-naphthol-4-sulfonic acid | Rose. |
| 41 | do | 1-acetyl amino-5-naphthol-7-sulfonic acid | Brown. |
| 42 | do | Phenol | Red yellow |
| 43 | do | Phenol, ethylated | Yellow. |
| 44 | do | Para cresol | Red yellow. |
| 45 | do | 1,3,5-xylenol | Orange. |
| 46 | do | Resorcin | Red yellow. |
| 47 | do | Ortho cyclohexyl phenol | Green yellow. |
| 48 | do | 4-hydroxy diphenyl | Red yellow. |
| 49 | do | 2-chlor-4-tertiary butyl phenol | Do. |
| 50 | do | Salicylic acid | Yellow. |
| 51 | do | 2-hydroxy-3-methyl-benzoic acid | Do. |
| 52 | do | 2-hydroxy-5-methyl-benzoic acid | Do |
| 53 | do | 3,5-dihydroxy benzoic acid | Red yellow. |
| 54 | do | 2-sulfo-4-methyl phenol | Do. |
| 55 | do | Dimethyl dihydroresorcin | Green yellow. |
| 56 | do | Barbituric acid | Do. |
| 57 | do | Aceto acetic ester | Yellow. |
| 58 | do | Beta naphthol | Yellow orange. |
| 59 | do | Tetra hydro beta naphthol | Do. |
| 60 | do | 4-acetyl-1-naphthol | Red orange. |
| 61 | do | 1-naphthol-3-sulfonic acid | Orange. |
| 62 | do | 1-naphthol-4-sulfonic acid | Do. |
| 63 | do | 1-naphthol-5-sulfonic acid | Do. |
| 64 | do | 1-naphthol-3,6-disulfonic acid | Do. |
| 65 | do | 2-naphthol-8-sulfonic acid | Do. |
| 66 | do | 8-hydroxy quinoline | Yellow brown. |
| 67 | do | 5-sulfo-8-hydroxy quinoline | Brownish orange. |
| 68 | do | Citrazinic acid | Greenish yellow. |
| 69 | do | 2,4-dihydroxy-5,6-dihydro pyrindene | Do. |

| Example | One mole of— | One mole of this coupled to— | One mole of— | Shade |
|---|---|---|---|---|
| 70 | Phenyl methyl pyrazolone | ←DCTDS→ | 2,4-dihydroxy quinoline | Yellow. |
| 71 | do | DCTDS→ | 2',5' dichlor-4' sulfo phenyl methyl pyrazolone | Do. |
| 72 | do | DCTDS→ | Barbituric acid | Do. |
| 73 | do | DCTDS→ | Aceto acetanilide | Do. |
| 74 | do | DCTDS→ | Aceto acetic ester | Do. |
| 75 | do | DCTDS→ | Para-cresol | Do. |
| 76 | do | DCTDS→ | Resorcin | Red yellow. |
| 77 | do | DCTDS→ | Tetrahydro-beta-naphthol | Do. |
| 78 | do | DCTDS→ | 1,3,5 xylenol | Yellow. |
| 79 | do | DCTDS→ | Phenol | Do. |
| 80 | do | DCTDS→ | Phenol+p-tolyl sulfonyl chloride | Do. |
| 81 | do | DCTDS→ | Salicylic acid | Do. |
| 82 | do | DCTDS→ | 1-acetyl amino-8-naphthol-6-sulfonic acid | Red orange. |
| 83 | Salicylic acid | ←DCTDS→ | 2,4 dihydroxy quinoline | Yellow. |
| 84 | do | DCTDS→ | Aceto acetanilide | Do. |
| 85 | do | DCTDS→ | 2-phenyl amino-8-naphthol-6-sulfonic acid | Brown. |
| 86 | 4' sulfo phenyl methyl pyrazolone. | ←DCTDS→ | Resorcin | Yellow. |
| 87 | do | DCTDS→ | Phenol+p-tolyl sulfonyl chloride | Do. |
| 88 | do | DCTDS→ | 2,4 dihydroxy quinoline | Do. |
| 89 | do | DCTDS→ | Aceto acetanilide | Do. |
| 90 | do | DCTDS→ | Barbituric acid | Do. |
| 91 | do | DCTDS→ | Aceto acetic ester | Do. |
| 92 | do | DCTDS→ | Para-cresol | Do. |
| 93 | 2-naphthol | ←DCTDS→ | 1-naphthol-4-sulfonic acid | Yellow orange. |
| 94 | do | DCTDS→ | 1-acetyl amino-8-naphthol-4-sulfonic acid | Very red orange. |
| 95 | Phenol | ←DCTDS→ | 2-naphthol+p-tolyl sulfonyl chloride | Orange. |
| 96 | do | DCTDS→ | 1-naphthol-3-sulfonic acid+p-tolyl sulfonyl chloride | Do. |
| 97 | do | DCTDS→ | 1-naphthol-4-sulfonic acid+p-tolyl sulfonyl chloride | Do. |
| 98 | do | DCTDS→ | 2-naphthol-6-sulfonic acid | Yellow orange. |
| 99 | do | DCTDS→ | 2-naphthol-6,8 disulfonic acid+p-tolyl sulfonyl chloride | Do. |
| 100 | do | DCTDS→ | Naphthionic acid+p-tolyl sulfonyl chloride acid | Brownish orange. |
| 101 | do | DCTDS→ | 2-amino-8-naphthol-6-sulfonic acid+p-tolyl sulfonyl chloride | Yellow red. |
| 102 | do | DCTDS→ | 2-phenylamino-8-naphthol-6-sulfonic acid+p-tolyl sulfonyl chloride | Brown. |
| 103 | do | DCTDS→ | 2-phenylamino-5-naphthol-7-sulfonic acid+p-tolyl sulfonyl chloride | Do. |
| 104 | do | DCTDS→ | 2-acetylamino-5-naphthol-7-sulfonic acid+p-tolyl sulfonyl chloride | Orange. |
| 105 | do | DCTDS→ | 1-acetylamino-8-naphthol-4-sulfonic acid+p-tolyl sulfonyl chloride | Red. |
| 106 | do | DCTDS→ | 1-acetylamino-7-naphthol+p-tolyl sulfonyl chloride | Orange. |
| 107 | do | DCTDS→ | 2'-chloro-5'-sulfo-phenyl-methyl pyrazolone | Yellow. |
| 108 | do | DCTDS→ | 2'-5'-dichloro-4'-sulfo-phenyl-methyl-pyrazolone+p-tolyl-sulfonyl chloride. | Do. |
| 109 | do | DCTDS→ | 2-naphthol-8-sulfonic acid+p-tolyl sulfonyl chloride | Orange. |
| 110 | do | DCTDS→ | 2-hydroxy-3-naphthoic acid+p-tolyl sulfonyl chloride | Do. |

The disclosed dyes are of value because they dye wool in level shades of good fastness to light and to wet treatments such as fulling, washing, perspiration, salt water, carbonizing, etc. Those which have no more than two sulfonic acid groups have good affinity for nylon and have the same good fastness properties that they possess when dyed on wool.

As many apparently widely different embodiments of this invention may be made without departing from the spirit and scope thereof, it is understood that we do not limit ourselves to the specific embodiments thereof except as defined in the appended claims.

We claim:

1. A compound represented by the formula

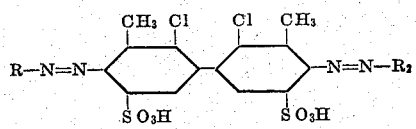

wherein R is the radical of an aryl pyrazolone of the benzene and naphthalene series and R₂ is the radical of one of the group represented by R and a phenol condensed with a p-tolyl-sulfonyl chloride.

2. The compounds represented by the formula

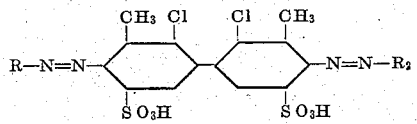

in which R and R₂ are both radicals of an aryl pyrazolone from the benzene and naphthalene series.

3. The compound represented by the formula

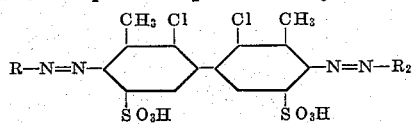

in which R and R₂ are both radicals of phenyl methyl pyrazolone.

4. The compounds represented by the formula

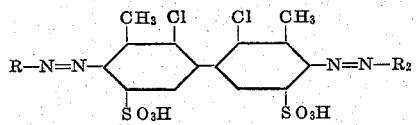

in which one of R and R₂ is a radical of an aryl pyrazolone from the benzene and naphthalene series and the other is the radical of a phenol condensed with a p-tolyl-sulfonyl-chloride.

5. The compound represented by the formula

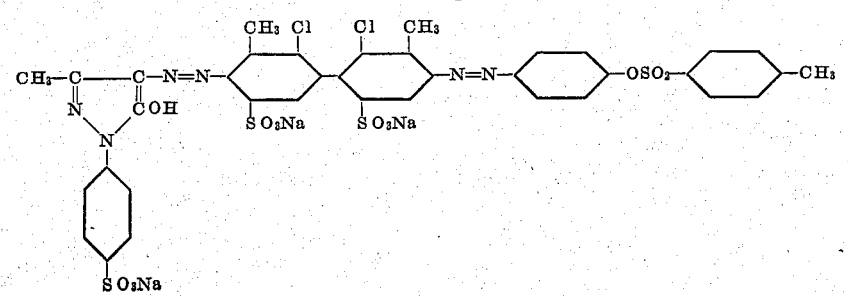

6. The process which comprises tetrazotizing 2,2-dichlor-tolidine-5,5'-disulfonic acid and coupling each diazo group thereof to an azo dyestuff coupling component, of which at least one is an aryl pyrazolone from the benzene and naphthalene series.

7. The process which comprises tetrazotizing 2,2'-dichloro-tolidine-5,5' - disulfonic acid and coupling each diazo group thereof to phenyl-methyl-pyrazolone.

WILLIAM B. REYNOLDS.
SWANIE S. ROSSANDER.
DONOVAN E. KVALNES.